(12) United States Patent
Gupta et al.

(10) Patent No.: US 9,917,918 B2
(45) Date of Patent: Mar. 13, 2018

(54) METHOD AND APPARATUS FOR DELIVERING CONTENT FROM CONTENT STORE IN CONTENT-CENTRIC NETWORKING

(71) Applicant: Samsung Electronics Co., Ltd., Suwon-si (KR)

(72) Inventors: Abhishek Gupta, Bangalore (IN); Kushal Bansal, Sunam (IN); Ramesh Abhilash Venkata, Bangalore (IN); Kaushik Swaminathan, Bangalore (IN); Myeong Wuk Jang, Hwaseong-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 359 days.

(21) Appl. No.: 14/448,082

(22) Filed: Jul. 31, 2014

(65) Prior Publication Data

US 2015/0039681 A1      Feb. 5, 2015

(30) Foreign Application Priority Data

Jul. 31, 2013   (IN) .......................... 3451/CHE/2013
Dec. 30, 2013   (IN) .......................... 3451/CHE/2013
May 30, 2014    (KR) ...................... 10-2014-0066229

(51) Int. Cl.
| | |
|---|---|
| *G06F 15/16* | (2006.01) |
| *H04L 29/08* | (2006.01) |
| *H04L 29/06* | (2006.01) |
| *G06F 17/30* | (2006.01) |

(52) U.S. Cl.
CPC ...... *H04L 67/2857* (2013.01); *H04L 65/4084* (2013.01); *G06F 17/30017* (2013.01); *G06F 17/30029* (2013.01); *G06F 17/30528* (2013.01)

(58) Field of Classification Search
CPC . H04L 67/327; H04L 67/306; H04L 67/2842; H04L 65/4084; G06F 17/30017; G06F 17/30029; G06F 17/30528
See application file for complete search history.

(56) References Cited

U.S. PATENT DOCUMENTS

| | | | |
|---|---|---|---|
| 8,923,293 B2* | 12/2014 | Jacobson | .............. H04L 45/745 370/392 |
| 2011/0145330 A1* | 6/2011 | Sundarrajan | ...... G06F 17/30902 709/203 |

(Continued)

*Primary Examiner* — Chirag R Patel
*Assistant Examiner* — Rachel J Hackenberg
(74) *Attorney, Agent, or Firm* — NSIP Law

(57) ABSTRACT

A method of delivering content includes receiving an interest packet including a plurality of requests in a content-centric networking (CCN), determining an availability of content for a first request among the plurality of requests in a content store (CS), fetching available pieces of content from the CS for a set of sequential requests starting from the first request among the plurality of requests in response to the content for the first request being available in the CS, the fetching comprising fetching available content for each remaining request subsequent to the first request among the sequential requests based on information from content identified for a request immediately preceding each remaining request, and delivering the fetched available pieces of content.

19 Claims, 17 Drawing Sheets

(56) References Cited

U.S. PATENT DOCUMENTS

| | | | |
|---|---|---|---|
| 2011/0239078 A1* | 9/2011 | Luby | H04N 21/23106 |
| | | | 714/752 |
| 2013/0212231 A1* | 8/2013 | Shi | H04L 65/605 |
| | | | 709/219 |
| 2014/0289325 A1* | 9/2014 | Solis | H04L 67/327 |
| | | | 709/204 |
| 2015/0006896 A1* | 1/2015 | Franck | H04L 63/04 |
| | | | 713/171 |
| 2015/0139166 A1* | 5/2015 | Yao | G06F 17/30867 |
| | | | 370/329 |
| 2015/0207838 A1* | 7/2015 | Gabin | H04L 65/4084 |
| | | | 709/219 |

* cited by examiner

SCENARIO 1: CLIENT ACCESSES CONTENT FROM CONTENT SERVER NODE

SCENARIO 2: CLIENT ACCESSES CONTENT FROM LOCAL CS

SCENARIO 1: CLIENT 1 RECEIVES CONTENT FROM CONTENT SERVER RATHER THAN CS OF CONTENT SERVER

SCENARIO 3: CLIENT 2 REQUESTS IDENTICAL CONTENT FROM
CONTENT SERVER AND RECEIVES CONTENT FROM CS OF
CONTENT SERVER

FIG. 9

| SCENARIO | THROUGHPUT (FILE SIZE:104170508 BYTES) WINDOW SIZE=10, NULL, NULL, UDP | | | | | THROUGHPUT (FILE SIZE:104170508 BYTES) WINDOW SIZE=100, NULL, NULL, UDP | | | | |
|---|---|---|---|---|---|---|---|---|---|---|
| | GENERAL METHOD (msec) | | PROPOSED METHOD (msec) | | AVERAGE GAIN | GENERAL METHOD (msec) | | PROPOSED METHOD (msec) | | AVERAGE GAIN |
| | ITERATION 1 | ITERATION 2 | ITERATION 1 | ITERATION 2 | | ITERATION 1 | ITERATION 2 | ITERATION 1 | ITERATION 2 | |
| 1 | 9763 | 9828 | 9732 | 9848 | ~0% | 9645 | 9496 | 9492 | 9486 | ~0% |
| 2 | 1830 | 1873 | 1170 | 1210 | 36% | 1250 | 1339 | 850 | 874 | 34% |

FIG. 10

THROUGHPUT
(FILE SIZE:1041170508 BYTES)
WINDOW SIZE=10, NULL, NULL, UDP

| SCENARIO | GENERAL METHOD (msec) | | | PROPOSED METHOD (msec) | | | AVERAGE GAIN |
|---|---|---|---|---|---|---|---|
| | ITERATION 1 | ITERATION 2 | ITERATION 3 | ITERATION 1 | ITERATION 2 | ITERATION 3 | |
| 1 | 9868 | 9754 | 10020 | 9774 | 9825 | 10001 | ~0% |
| 3 | 10142 | 10610 | 10077 | 9615 | 9355 | 9450 | 7.8% |

METHOD AND APPARATUS FOR DELIVERING CONTENT FROM CONTENT STORE IN CONTENT-CENTRIC NETWORKING

CROSS-REFERENCE TO RELATED APPLICATIONS

This application claims the benefit under 35 USC 119(a) of Indian Provisional Application No. 3451/CHE/2013 filed on Jul. 31, 2013, in the Indian Patent Office, Indian Complete Application No. 3451/CHE/2013 filed on Dec. 30, 2013, in the Indian Patent Office, and Korean Patent Application No. 10-2014-0066229 filed on May 30, 2014, in the Korean Intellectual Property Office, the entire disclosures of which are incorporated herein by reference for all purposes.

BACKGROUND

1. Field

The following description relates to a method and apparatus for delivering content from a content store (CS) in a content-centric networking (CCN).

2. Description of Related Art

Currently, Transmission Control Protocol (TCP)-based data packet networks are used in a computing environment. A TCP is a fundamental protocol within an Internet architecture that manages transmission of data packets over a data network. In TCP-based data networks, a user or consumer of content may receive content by explicitly requesting the content from an Internet Protocol (IP) address associated with a location at which a physical device is positioned. Such a restrictive addressing scheme may be inadequate for fast growing network demands. Apart from the TCP, there are other protocols, for example, a User Datagram Protocol (UDP), that also use the IP-based addressing scheme.

Further, in the TCP-based data packet networks, a request may be transmitted by the user or consumer to receive the content. The request may reach a content server in a network. The content server may transmit the requested content to the consumer. Similarly, for every piece of content, a new request may be transmitted by the consumer to the content server to receive the requested content. As an alternative to existing TCP- or UDP-based data packet networks, a content-centric networking (CCN) or a named data networking (NDN) has been developed.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, a method of delivering content includes receiving an interest packet including a plurality of requests in a content-centric networking (CCN); determining an availability of content for a first request among the plurality of requests in a content store (CS); fetching available pieces of content from the CS for a set of sequential requests starting from the first request among the plurality of requests in response to the content for the first request being available in the CS, the fetching including fetching available pieces of content for each remaining request subsequent to the first request among the sequential requests based on information from content identified for a request immediately preceding each remaining request; and delivering the fetched available pieces of content.

The method may further include transmitting the interest packet to an adjacent node in the CCN to fetch available pieces of content from the adjacent node in response to the content for the first request being unavailable in the CS.

The method may further include changing the interest packet based on an availability of the content in the CS for the set of sequential requests before transmitting the changed interest packet to an adjacent node.

The changing may include changing a parameter of the interest packet by changing either one or both of a request start segment number and a number of the requests included in the interest packet.

The fetching may include matching the content for the first request to interest fields in the interest packet in response to the content for the first request being available in the CS; the interest fields may include either one or both of a prefix of the interest packet and a segment number of content; and the delivering may include transmitting the content for the first request to a node requesting the content for the first request in the CCN in response to the content for the first request being matched to the interest fields.

The information may represent an index or a pointer of the content identified for the request immediately preceding each remaining request.

Each piece of content in the CS may be a piece of candidate content; and the fetching of the available pieces of content for each remaining request may include matching a prefix of each piece of candidate content to a prefix of the content identified for the request immediately preceding each remaining request to identify content subsequent to the content identified for the request immediately preceding each remaining request.

Each piece of content in the CS may be a piece of candidate content; and the fetching of the available pieces of content for each remaining request may include matching a segment number of each piece of candidate content to a segment number of the content identified for the request immediately preceding each remaining request to identify content subsequent to the content identified for the request immediately preceding each remaining request.

The fetching of the available pieces of content for each remaining request may further include matching a prefix of each piece of candidate content to a prefix of the content identified for the request immediately preceding each remaining request to identify the content subsequent to the content identified for the request immediately preceding each remaining request; and the matching of the segment number of each piece of candidate content to the segment number of the content identified for the request immediately preceding each remaining request may include identifying a piece of candidate content having a prefix that matches the prefix of the content identified for the request immediately preceding each remaining request and having a segment number that differs by 1 from the segment number of the content identified for the request immediately preceding each remaining request as content immediately subsequent to the content identified for the request immediately preceding each remaining request.

In another general aspect, a non-transitory computer-readable storage medium stores instructions to cause a computer to perform the described above.

In another general aspect, a node configured to deliver content in a content-centric networking (CCN) includes an integrated circuit including a processor; and a memory storing computer program code to be executed by the processor; wherein the processor is configured to cause the node to perform a method in response to the computer program code being executed, the method including receiving an interest packet including a plurality of requests; determining an availability of content for a first request among the plurality of requests in a content store (CS); fetching available pieces of content from the CS for a set of sequential requests starting from the first request among the plurality of requests in response to the content for the first request being available in the CS, the fetching including fetching available pieces of content for each remaining request subsequent to the first request among the sequential requests based on information from content identified for a request immediately preceding each remaining request; and delivering the fetched available pieces of content.

The method of the node may further include transmitting the interest packet to an adjacent node in the CCN to fetch available pieces of content from the adjacent node in response to the content for the first request being unavailable in the CS.

The method of the node may further include changing the interest packet based on an availability of the content in the CS for the set of sequential requests before transmitting the changed interest packet to an adjacent node.

The method of the node may further include changing a parameter of the interest packet by changing either one or both of a request start segment number and a number of the requests included in the interest packet.

The method of the node may further include matching the content for the first request to interest fields in the interest packet in response to the content for the first request being available in the CS; the interest fields may include either one or both of a prefix of the interest packet and a segment number of content; and the delivering may include transmitting the content for the first request is transmitted to a node requesting the content for the first request in the CCN in response to the content for the first request being matched to the interest fields.

The information may represent an index or a pointer of the content identified for the request immediately preceding each remaining request.

Each piece of content in the CS is a piece of candidate content; and the matching of the available pieces of content for each remaining request may include matching a prefix of each piece of candidate content to a prefix of the content identified for the request immediately preceding each remaining request to identify content subsequent to the content identified for the request immediately preceding each remaining request.

Each piece of content in the CS is a piece of candidate content; and the fetching of the available pieces of content for each remaining request may include matching a segment number of each piece of candidate content to a segment number of the content identified for the request immediately preceding each remaining request to identify content subsequent to the content identified for the request immediately preceding each remaining request.

The fetching of the available pieces of content for each remaining request may further include matching a prefix of each piece of candidate content to a prefix of the content identified for the request immediately preceding each remaining request to identify the content subsequent to the content identified for the request immediately preceding each remaining request; and the matching of the segment number of each piece of candidate content to the segment number of the content identified for the request immediately preceding each remaining request may include identifying a piece of candidate content having a prefix that matches the prefix of the content identified for the request immediately preceding each remaining request and having a segment number that differs by 1 from the segment number of the content identified for the request immediately preceding each remaining request as content immediately subsequent to the content identified for the request immediately preceding each remaining request.

In another general aspect, a method of delivering content includes receiving an interest packet including a plurality of requests for sequential pieces of content at a node of a content-centric network (CCN); fetching available sequential pieces of content from a content store of the node for sequential requests of the plurality of requests based on a first piece of content of the fetched sequential pieces of content; and delivering the fetched sequential pieces of content.

The method may further include changing the interest packet to request remaining pieces of content that are not available in the content store of the node; and transmitting the changed interest packet to another node in the CCN.

The fetching may include fetching a piece of content in the content store having a prefix and a segment number that match a prefix and a segment number of a first request of the sequential requests; and for each remaining request of the sequential requests, fetching a piece of content in the content store having a prefix that matches a prefix of a fetched piece of content fetched in response to an immediately preceding one of the sequential requests and a segment number that differs by 1 from a segment number of the fetched piece of content fetched in response to the immediately preceding one of the sequential requests.

Other features and aspects will be apparent from the following detailed description, the drawings, and the claims.

BRIEF DESCRIPTION OF THE DRAWINGS

FIG. 9 illustrates an example of results of comparing times used to deliver content from a CS for the scenarios of FIGS. 7A and 7B.

FIG. 10 illustrates an example of results of comparing times used to deliver content from a CS for the scenarios of FIGS. 8A and 8B.

DETAILED DESCRIPTION

Figure 1:
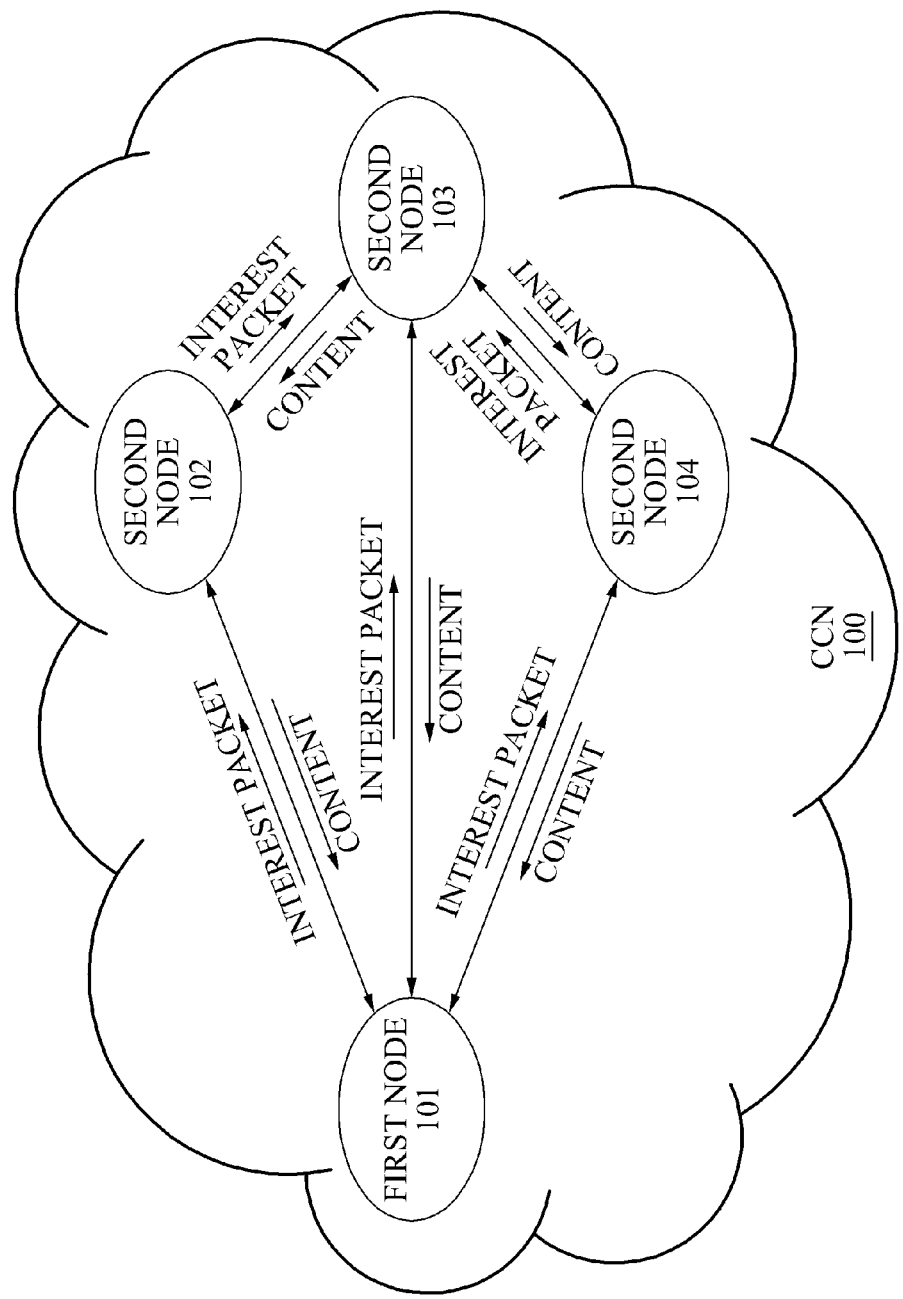
FIG. 1 illustrates an example of a content-centric networking (CCN).

The following detailed description is provided to assist the reader in gaining a comprehensive understanding of the methods, apparatuses, and/or systems described herein. However, various changes, modifications, and equivalents of the methods, apparatuses, and/or systems described herein will be apparent to one of ordinary skill in the art. The sequences of operations described herein are merely examples, and are not limited to those set forth herein, but may be changed as will be apparent to one of ordinary skill in the art, with the exception of operations necessarily occurring in a certain order. Also, descriptions of functions and constructions that are well known to one of ordinary skill in the art may be omitted for increased clarity and conciseness.

Throughout the drawings and the detailed description, the same reference numerals refer to the same elements. The drawings may not be to scale, and the relative size, proportions, and depiction of elements in the drawings may be exaggerated for clarity, illustration, and convenience.

Throughout the following description, the term "node" may refer to a "node device". For example, the term "node" may be used interchangeably with the term "node device".

Content-centric networking (CCN) or a content-centric network is an alternative approach to a computer network architecture that provides a new networking principle for efficient information sharing using content names that may replace host Internal Protocol (IP) addresses in Transmission Control Protocol (TCP)/User Datagram Protocol (UDP) networks or a complete TCP/IP network stack.

The CCN makes it possible to implement communication networks that allow a user to focus on data requested by the user, rather than having a specific reference, for example, a physical location, from which content is received. The CCN may also provide routing, default caching of the content, and per-packet security.

In the CCN, a request packet may be an interest (packet), and a response packet may be a content object. Content may be divided into chunks, for example, content objects, of appropriate sizes. Each interest (packet) may request a chunk. A node requesting the content may transmit a number of interest packets, each associated with a content object, in a sequential manner. In the CCN, for every interest (packet), at most one content object may be received. Further, the transmitted interest may be propagated toward a content source by applying a suitable name-based routing method. Each intermediate node receiving the interest packet in the CCN may search a content cache, for example, a content store (CS) belonging to the intermediate node, for the content object. When the requested content object is found in the CS, the intermediate node may respond with the content object. When the requested content object is not found in the CS, the intermediate node may deliver the interest packet to a subsequent node, for example, an adjacent node, in the CCN after checking forwarding information base (FIB) table entries for a forwarding face. Before delivering the interest packet, the intermediate node may store interest packet information in an interest table of the intermediate node known as a pending interest table (PIT). Forwarding information may be populated manually or through a suitable routing method, and stored in an FIB table. A node containing the content object may respond to a requester using a reverse path formed by PIT entries created by intermediate nodes. When the interest is satisfied by the content, the PIT entries may be removed by the intermediate nodes, including end nodes, while the content passes along the reverse path.

The original CCN design assumes that for one interest, at most one content object may be expected to be received. In lieu of using such an inefficient method of transmitting a single interest at a time, a plurality of requests may be aggregated to form an interest packet. Requests for the interest packet may not be transmitted for a single content object, but for a number of content objects, which may be monitored by a dynamically changing entity known as a window size of the interest packet.

Initially, an interest packet with a window size w_max, that is, a pre-defined max value, may be transmitted. When a content transmitter receives the interest packet, the content transmitter may read the window size of the interest packet and transmit content to a requesting node. Further, interest packet information may include a segment start range. First missing content may be considered a point at which a new interest packet is to be constructed and transmitted to a subsequent node in the CCN. Through this, the window size of the interest packet may be reduced, or remain unchanged, by each node based on an availability of the content at each node.

Content in the CS may be organized in an orderly fashion, even for the same name component despite varying segments, also referred to as CCN chunks. When the interest packet is received by a node, the CS may be searched for the corresponding content before the interest packet is delivered. In a case of a normal CCN scenario, one-to-one mapping may occur between an interest (packet) and a segment number of content, for example, denoting a content object.

When the interest packet including a plurality of requests is transmitted to obtain the content, the interest packet may request a group of contiguous content. In a case in which a normal method of accessing the CS is used, for example, when the interest is received, the interest packet may be repeatedly reconstructed over the window size before determining a presence of content in the CS. This is due to an existing CS access mechanism not supporting a case in which the interest packet requests a plurality of pieces of content. Thus, encoding and decoding of the interest packet may be performed repeatedly over the window size.

The examples described below achieve a method of delivering content from a CS by a node in a CCN. The node in the CCN may receive an interest packet including a plurality of requests. In this example, the node may include any electronic device such as, for example, a desktop computer, a laptop computer, a mobile phone, or any other device capable of connecting to a network. When the node receives the interest packet, the node determines an availability of content for a first request in the CS. When the content for the first request is available, the content for the first request is verified by the node matching the content to interest fields, for example, a prefix of the interest packet and a segment number of the content. When the content for the first request is verified, the node transmits the content to a node requesting the content from the CS. For example, the first request may be a primary request when the requests included in the interest packet are arranged in a predetermined order.

Further, the node may fetch pieces of content for a set of sequential requests based on information of content identified for an immediately preceding request. The information may represent an index or a pointer of the content identified for the preceding request. The set of sequential requests may include an entirety or a portion of the requests included in the interest packet.

In one example, content for each request subsequent to the first request may be identified using a subsequent pointer of content identified for a request immediately preceding each request.

All of the requests in the interest packet may be processed by the node using subsequent pointers or indices of pieces of content identified for preceding requests.

FIG. 1 illustrates an example of a CCN 100.

Referring to FIG. 1, the CCN 100 includes a first node 101, and a plurality of second nodes 102, 103, and 104. The first node 101 transmits an interest packet including a plurality of requests to a second node. The interest packet may include parameters including a number of requests and a request start segment number. However, the parameters are not limited thereto.

In response to the interest packet from the first node 101, a local CS (h=0) of the first node 101 or the second nodes 102, 103, and 104 transmit available pieces of content associated with the requests to the first node 101 based on an availability of the content in the local CS of each of the first node 101 and the second nodes 102, 103, and 104. In this example, h denotes a hop count.

The interest packet is received by the local CS of the first node 101. The local CS (h=0) of the first node 101 identifies the pieces of content associated with the requests in the interest packet, and transmits the identified pieces of content to the first node 101.

The interest packet may be transmitted to an adjacent second node in the CCN based on the availability of the content in the local CS of the first node 101. The interest packet may be changed or modified before being transmitted to the adjacent second node in the CCN. The parameters in the interest packet may be changed or modified based on the availability of the content associated with the requests in the interest packet.

Figure 2:
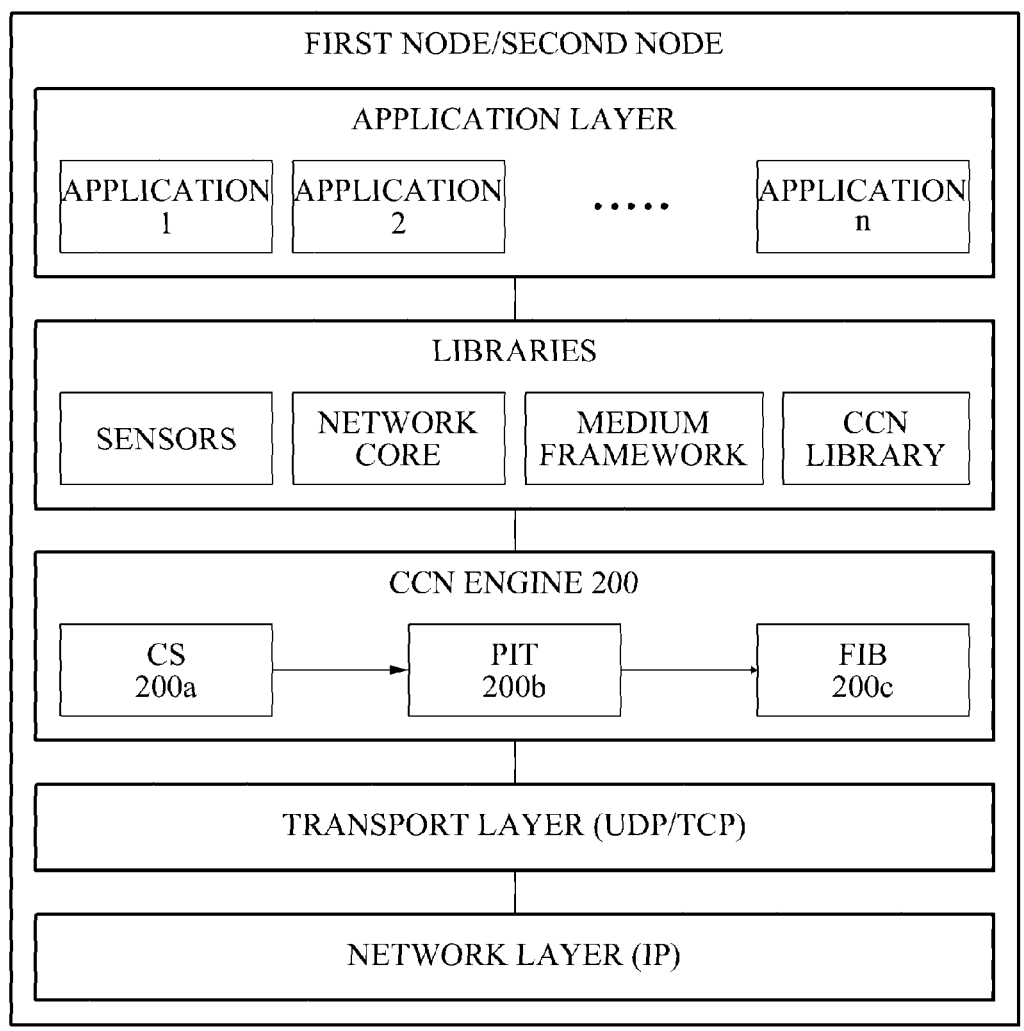
FIG. 2 illustrates an example of a node in a CCN.

FIG. 2 illustrates an example of a node in a CCN.

Referring to FIG. 2, a first node or a second node, for example, the first node 101 or each of the second nodes 102, 103, and 104 of FIG. 1, in the CCN includes an application layer including a plurality of applications, for example, applications 1 through N. In one example, an application may be a browser installed in the first node.

The first node or the second node in the CCN further includes libraries including sensors, a network core, a media framework, and a CCN library. However, the libraries of the first node or the second node are not limited thereto.

The first node or the second node further includes a CCN engine 200. The CCN engine 200 includes a CS 200a, a pending interest table (PIT) 200b, and a forwarding information base (FIB) 200c. A node such as the first node 101 requesting content transmits an interest packet including at least one request each corresponding to a content object. The transmitted interest (packet) may be propagated toward the CS 200a by applying a suitable name-based routing method. Each intermediate node receiving the interest packet determines an availability of the content object in a content cache, for example, a CS, belonging to each intermediate node.

When the requested content object is found in the CS 200a, the intermediate node responds with the content object. When the requested content object is not found in the CS 200a, the intermediate node delivers the interest packet to a subsequent node. Before delivering the interest packet, the intermediate node stores interest packet information in an interest table, for example, the PIT 200b. Forwarding information may be populated manually or through a suitable routing method, and stored in the FIB 200c.

The CCN engine 200 transmits the interest packet to a network layer through a transport layer as shown in FIG. 2.

The technical descriptions provided with reference to FIG. 1 are also applicable to FIG. 2, and thus will be omitted for conciseness.

Figure 3:
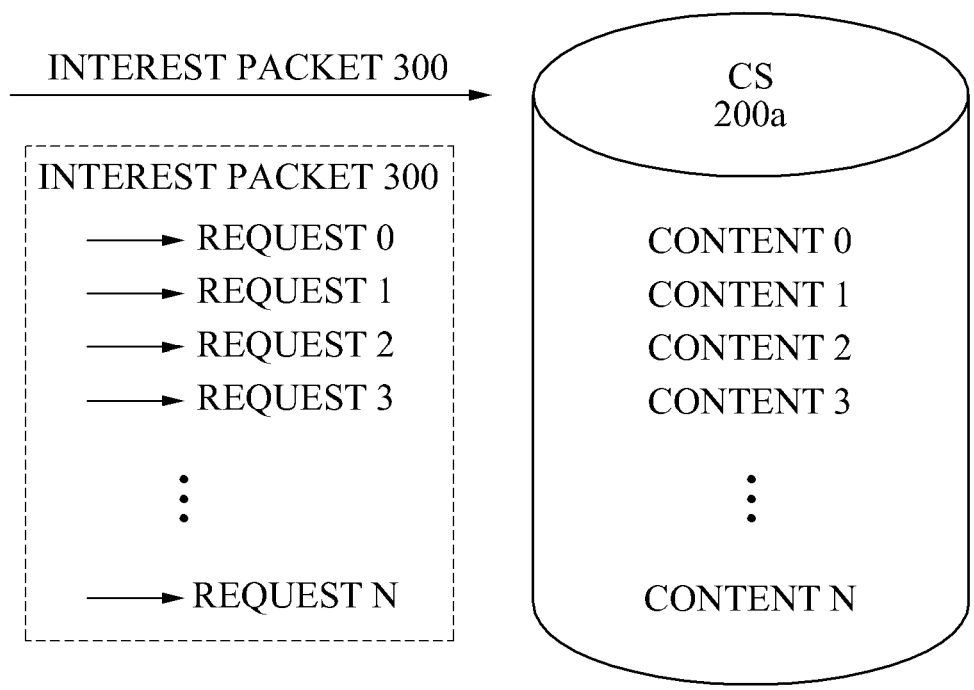
FIG. 3 illustrates an example of a method of storing pieces of content in a content store (CS).

FIG. 3 illustrates an example of a method of storing pieces of content in the CS 200a of FIG. 2.

Referring to FIG. 3, content in the CS 200a may be organized in an orderly fashion. For example, the content, for example, content 0 through content N, may be stored in the CS 200a in a sequential manner. Further, an interest packet 300 including a plurality of requests, for example, requests 0 through N, may be received by the CS 200a. When the CS 200a receives the interest packet 300, the CS 200a determines an availability of the content 0 for the request 0 in the interest packet 300. When the content 0 is available, remaining subsequent requests, for example, requests 1 through N, may be processed by the CS 200a based on information of the identified content 0. In one example, content information may represent an index or a pointer of content identified for an immediately preceding request. The identified content may be fetched, for example, from the CS 200a.

The technical descriptions provided with reference to FIGS. 1 and 2 are also applicable to FIG. 3, and thus will be omitted for conciseness.

Figure 4A:
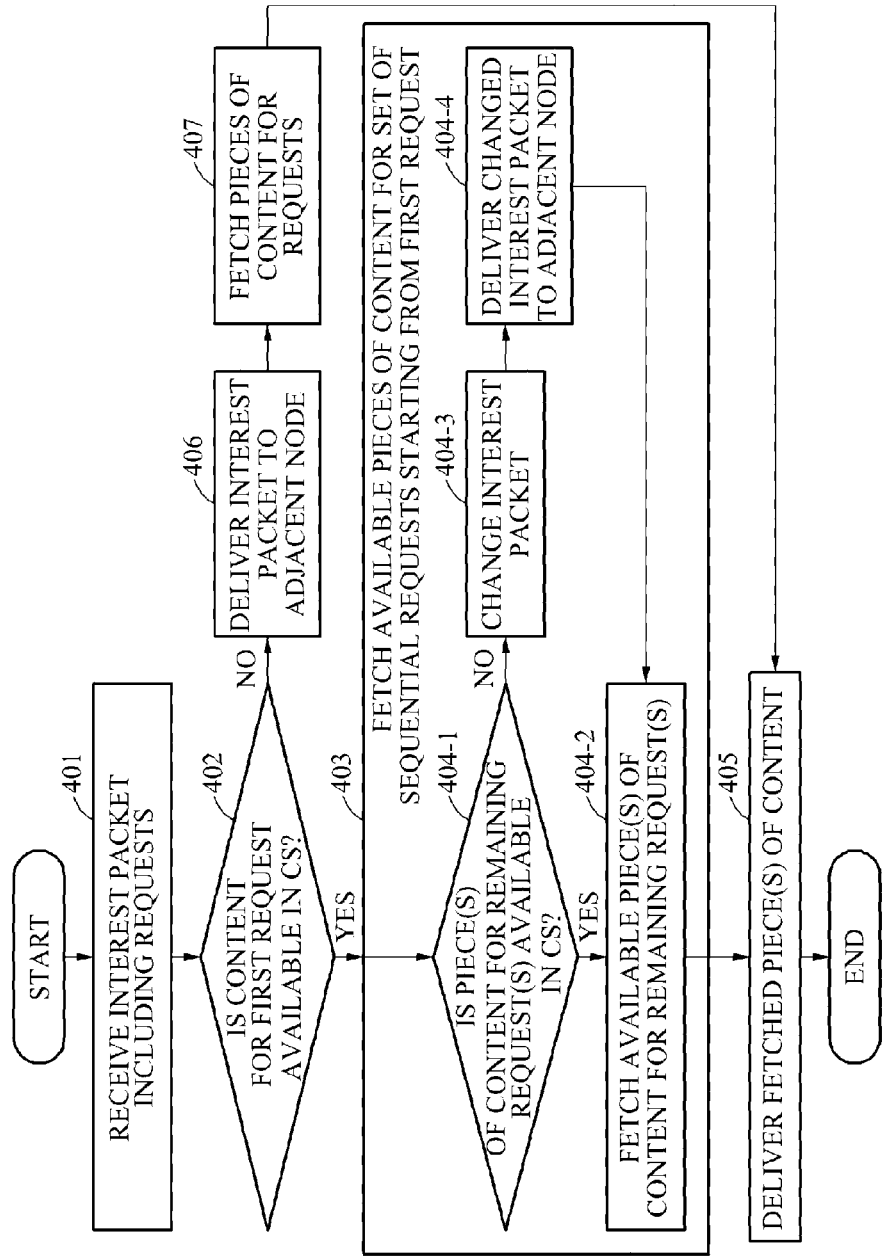
FIG. 4A illustrates an example of a method of delivering pieces of content from a CS.

FIG. 4A illustrates an example of a method of delivering pieces of content from a CS.

Referring to FIG. 4A, in operation 401, a node in a CCN receives an interest packet including a plurality of requests. When the node receives the interest packet, the node determines an availability of content for a first request among the plurality of requests in the interest packet in a CS belonging to the node in operation 402.

In operation 402, the node determines whether the content for the first request is available in the CS. When the node determines that the content for the first request is available, the node fetches available pieces of content for a set of sequential requests starting from the first request, for example, from the CS in which pieces of content exist, in operation 403. Operation 403 includes operations 404-1 through 404-4.

In operation 404-1, the node determines whether piece(s) of content for remaining request(s), excluding the first request among the set of sequential requests starting from the first request, is available in the CS.

When the piece(s) of content for the remaining request(s) is available in the CS, the node fetches the piece(s) of content for the remaining request(s) in operation 404-2.

When at least one of the piece(s) of the content for the remaining request(s) is unavailable in the CS, the node changes the received interest packet in operation 404-3. In operation 404-4, the node transmits or delivers the changed interest packet to an adjacent node. For example, the node may change the interest packet before transmitting the received interest packet to the adjacent node based on availabilities of the pieces of content for the set of sequential requests starting from the first request in the CS. The node may change a parameter of the interest packet by changing either one or both of a request start segment number and a number of the requests included in the interest packet.

Operations similar to operations 402 and 403 described above and operations 405 through 407 to be described later are performed by the adjacent node receiving the changed interest packet, and the piece(s) of content for the remaining request(s), excluding the first request among the set of sequential requests starting from the first request, may be identified and fetched.

In operation 405, the node delivers the available pieces of content in the CS. For example, the node delivers the fetched piece(s) of content. Contrary to the drawing, the node may deliver content for each request to a node requesting the content every time the content for each request is identified and fetched.

When it is determined in operation 402 that the content for the first request is unavailable in the CS, the node transmits or delivers the interest packet to an adjacent node in the CCN in operation 406. When the content for the first request is unavailable in the CS, the node may transmit the interest packet to the adjacent node in the CCN to fetch available pieces of content for requests.

Operations similar to operations 402 through 406 described above may be performed by the adjacent node receiving the interest packet, and pieces of content for the plurality of requests included in the interest packet or pieces of content for the set of sequential requests starting from the first request are identified and fetched in operation 407.

The identified and fetched pieces of content are delivered to a node requesting the content.

In operation 403, the node may identify and fetch content for each request based on information from identified preceding content for a request immediately preceding each request. For example, available content for each remaining request subsequent to the first request among the sequential requests may be fetched based on information from content identified for a request immediately preceding each request.

The flowchart of FIG. 4A will now be described with respect to the following examples.

An interest packet including ten requests, that is requests 0 through 9, is received by a node. The node determines whether content for a first request, for example, the request 0, is available in a CS belonging to the node. When the content for the request 0 is unavailable in the CS belonging to the node, the node delivers the interest packet to an adjacent node in a CCN. The adjacent node may be a second node in the CCN.

When the content for the first request is available in the CS belonging to the node, the node processes a set of sequential requests starting from the first request in the interest packet. The CS belonging to the node transmits the identified content for the first request to the node, and initiates processing of remaining sequential requests after the first request is processed.

A request 1 subsequent to the request 0 is processed based on information of the identified content for the request 0. Content in the CS may be assumed to be stored in a sequential manner. Thus, the CS may detect, or identify, content 1 for the request 1 based on information on the identified content 0 for the request 0. Information of content may include, for example, an index in which each piece of content is available in the CS.

The CS processes the request 1 to identify the content 1 using the index or a subsequent pointer of the identified content 0 for the request 0. When the content 1 is available based on the information of the content 0, the CS transmits the content 1 to the node requesting the content 1 from the CCN.

Similarly, the CS belonging to the node processes a third request, for example, a request 2, based on information of the immediately preceding content, for example, the content 1. The CS belonging to the node identifies the content 2 for the request 2, and transmits the content 2 to the node.

When it is determined that the content 2 is unavailable in the CS, the node including the CS changes or modifies the interest packet, and transmits the changed or modified interest packet to an adjacent node in the CCN.

Thus, as described above, the content in the CS is identified based on information of identified immediately preceding content available in the CS. When specific content for a request is unavailable, the node modifies the interest packet. The node transmits the modified interest packet to an adjacent node in the CCN to obtain piece(s) of content for the plurality of requests in the interest packet.

The interest packet may be changed or modified by changing a parameter of the interest packet. For example, when only the content 0 and the content 1 are available in the CS belonging to the node, the interest packet may be changed or modified, and transmitted to the adjacent node.

For example, a number of the requests in the interest packet may be changed to 8, and a request start segment number may be changed to 2. The changed or modified interest packet is transmitted to the adjacent node by the initial node requesting the content from the CCN.

The adjacent node receives the interest packet configured to identify the content for a first request, for example, a primary request, starting from the request 2. The adjacent node identifies content for the request 2 by searching a CS belonging to the adjacent node. When the content for the request 2 is identified in the CS, the adjacent node processes a request 3 based on information on the available content, for example, the content 2, for the request 2.

The request 3 is processed by the CS belonging to the adjacent node based on information on the identified preceding content, for example, the content for the request 2.

Thus, using the method described above, the content in the CS may be easily accessed, and a CS access time may be optimized. Operations of FIG. 4A may be performed in the illustrated order, in a different order, or simultaneously. In addition, in some examples, some of the operations of FIG. 4A may be omitted.

Figure 4B:
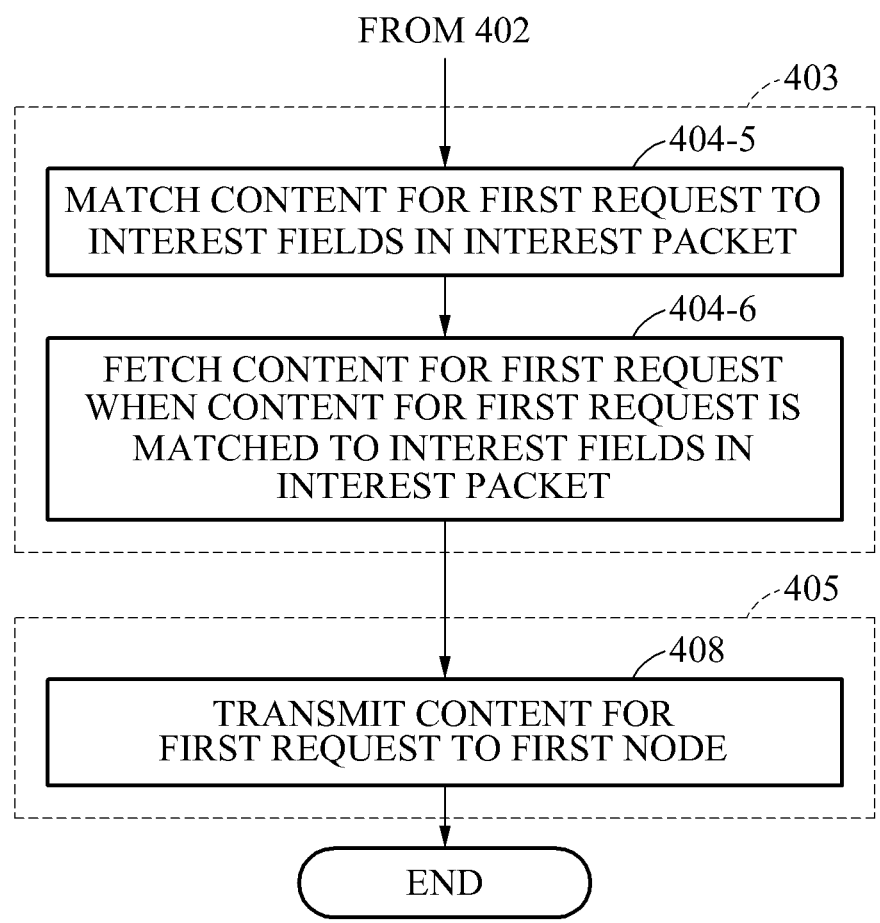
FIG. 4B illustrates an example of a method of fetching content for a first request and an example of a method of delivering the fetched content for the first request.

FIG. 4B illustrates an example of a method of fetching content for a first request and an example of a method of delivering the fetched content for the first request.

Operation 403 of FIG. 4A includes operations 404-5 and 404-6, and operation 405 of FIG. 4A includes operation 408.

When the content for the first request is available in the CS, the node matches the content for the first request to interest fields in the received interest packet in operation 404-5. The interest fields in the received interest packet may include either one or both of a prefix of the interest packet and a segment number of the content.

In operation 404-6, the node fetches the content for the first request when the content for the first request is matched to the interest fields of the received interest packet.

In operation 408, the node transmits the content for the first request to a first node requesting the content for the first request in the CCN when the content for the first request is matched to the interest fields of the received interest packet. For example, the node may transmit the fetched content for the first request to the first node requesting the content for the first request in the CCN.

Figure 4C:
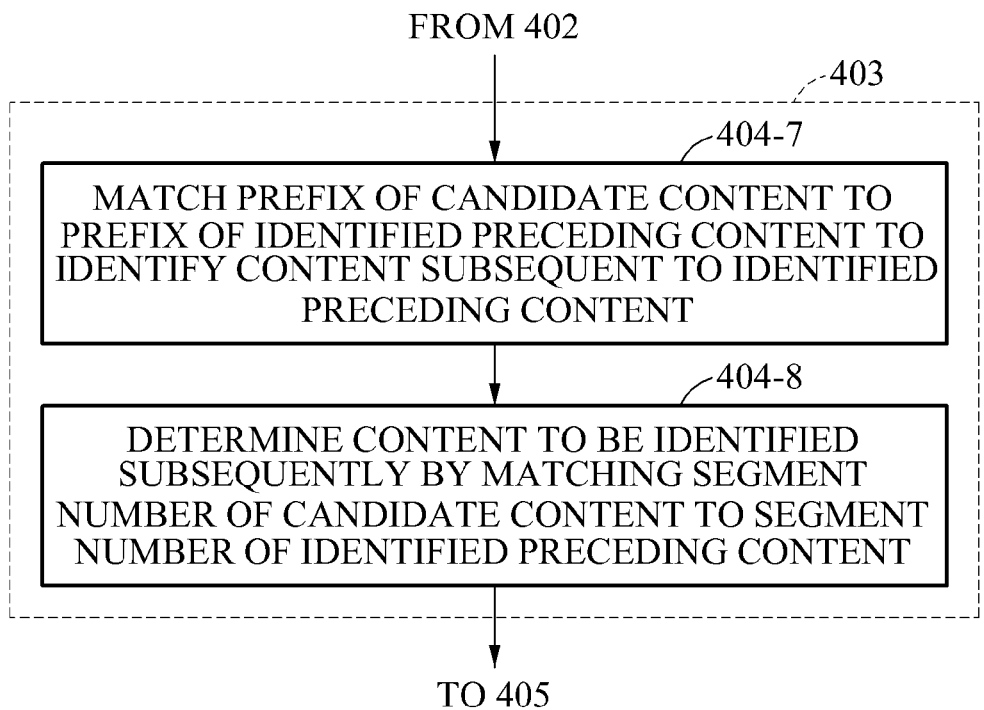
FIG. 4C illustrates an example of a method of fetching pieces of content for sequential requests.

FIG. 4C illustrates an example of a method of fetching pieces of content for sequential requests.

Operation 403 of FIG. 4A includes operations 404-7 and 404-8.

In operation 404-7, the node matches a prefix of each piece of candidate content to a prefix of identified immediately preceding content to identify content subsequent to the identified immediately preceding content. Each piece of content in the CS may be a piece of candidate content.

In operation 404-8, the node determines content to be identified immediately subsequent to the identified preceding content by matching a segment number of each piece of the candidate content to a segment number of the identified preceding content. The pieces of candidate content in operation 404-8 may be pieces of content having prefixes matched by way of operation 404-7.

For example, the prefix of the identified preceding content may be matched to the prefix of the content to be identified immediately subsequent to the identified preceding content. A difference between a segment number of the identified preceding content and a segment number of the content to be identified immediately subsequent to the identified preceding content may be 1.

The technical descriptions provided with reference to FIGS. 1 through 3 are also applicable to FIGS. 4A through 4C, and thus will be omitted for conciseness.

Figure 5:
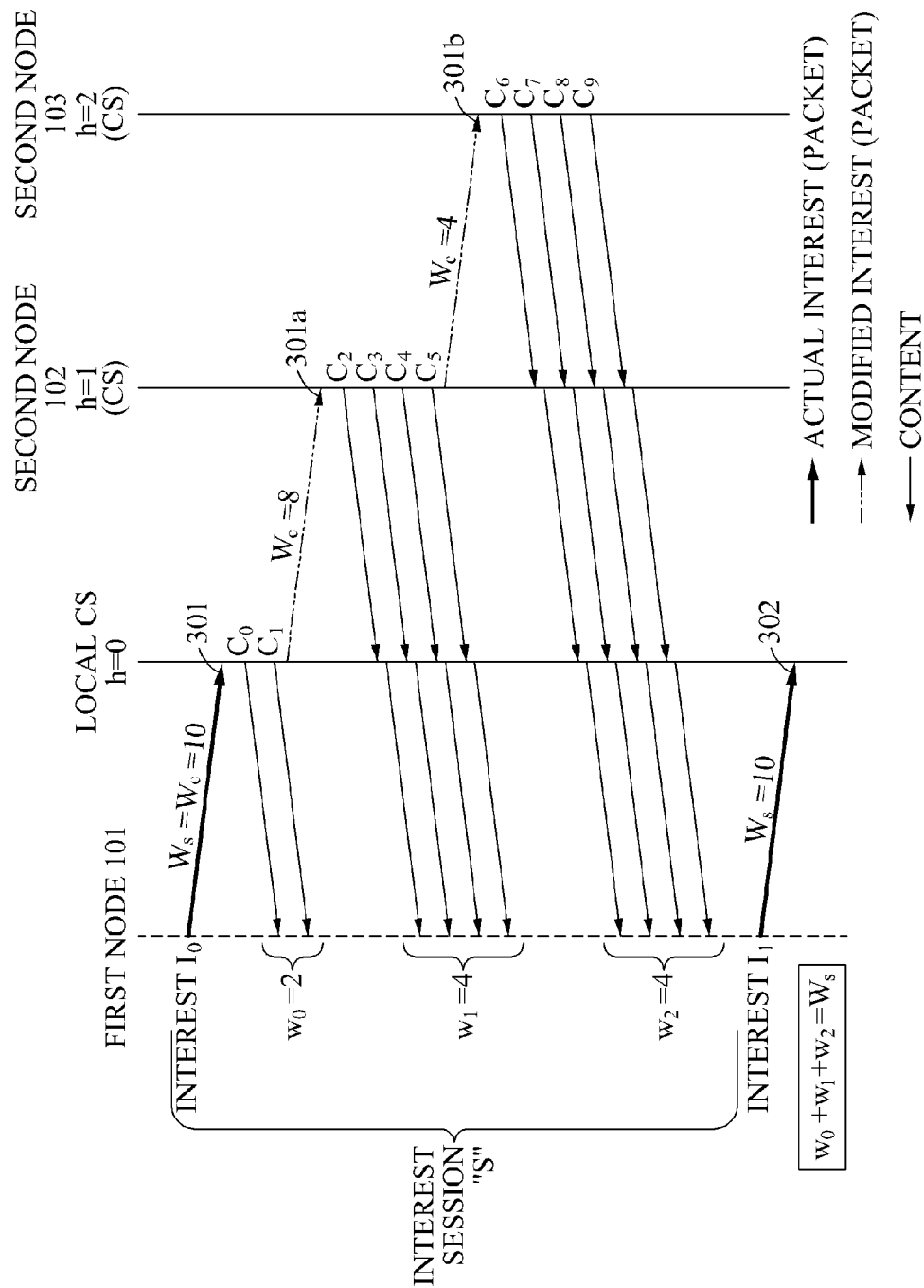
FIG. 5 illustrates an example of a method of delivering pieces of content from a CS when an interest packet includes a plurality of requests.

FIG. 5 illustrates an example of a method of delivering pieces of content from a CS when an interest packet includes a plurality of requests.

In FIG. 5, the first node 101 and the plurality of second nodes 102 and 103 are provided. In this example, a number of requests is 10. However, more than 10 requests or less than 10 requests may be included in an interest packet used to obtain content from a CCN.

Referring to FIG. 5, the first node 101 transmits an interest packet 301 (for example, an actual interest) having a request size ($W_c$) of 10 to a local CS (h=0) to obtain content associated with requests. $W_c$ is an abbreviation of $W_{current}$, and denotes a current window size. $W_c$ is initially equal to $W_s$, which is an abbreviation of $W_{start}$ and denotes an initial window size indicating an initial request size of the interest packet 301, but $W_c$ may be changed by changing or modifying the interest packet 301 as shown in FIG. 5 and described below.

An application in the first node 101 is configured to transmit the interest packet 301 to the local CS (h=0). For example, the application may be a browser.

The local CS (h=0) receives the interest packet 301 from the first node 101. The local CS processes the interest packet 301 to identify the content associated with the requests. The local CS determines whether content $C_0$ for a first request is available. When the content $C_0$ is available, the local CS parses the content $C_0$. The local CS may verify the content $C_0$ for the first request by matching the content $C_0$ to interest fields, for example, a prefix and a segment number, of the content $C_0$. The local CS verifies that the content $C_0$ is matched to the interest fields. The local CS delivers the content $C_0$ to the first node 101.

As illustrated in FIG. 5, the local CS (h=0) transmits content for a request 0, for example, the content $C_0$, in response to the actual interest packet 301 received from the first node 101.

The local CS (h=0) fetches content $C_1$ for a second request, for example, a request 1, based on information of the content $C_0$ for the request 0.

The information may represent a subsequent index or a subsequent pointer of the content 0.

Since content is stored in a sequential manner as illustrated in FIG. 3, the content for the request 1 may be easily fetched using the subsequent index or the subsequent pointer of the identified content 0 (the content $C_0$). When the local CS (h=0) fetches the content for the request 1, the content (the content $C_1$) may be encoded and stored in the local CS belonging to the first node 101. Thus, the local CS may parse the content (the content $C_1$). The local CS may match the content (the content $C_1$) to the prefix of the preceding content (for example, the content $C_0$). When a prefix of the content $C_1$ is matched to the prefix of the content $C_0$, a determination may be performed to verify whether the content $C_1$ is content subsequent to the content $C_0$.

When the prefix of the content $C_1$ is not matched to the prefix of the content $C_0$, the interest packet 301 is changed or modified, and transmitted to an adjacent node, for example, the second node 102.

The determination may be performed by matching a segment number of the content $C_1$ to the segment number of the content $C_0$.

To determine whether the content $C_1$ is content subsequent to the content $C_0$, it is determined whether a difference between the segment number of the content $C_1$ and the segment number of the content $C_0$ is 1.

When the determination is true, for example, when the content $C_1$ indicates content subsequent to the content $C_0$, verification may be performed by matching the content (content $C_1$) to remaining interest fields. When the content $C_1$ is matched to the remaining interest fields, the content $C_1$ is transmitted from the local CS (h=0) to the first node 101.

The content $C_0$ associated with the request 0 and the content $C_1$ associated with the request 1 are received by the first node 101 after a processing time (PT) at the local CS (h=0) elapses. Similarly, content associated with each request in the interest packet 301 is received by the first node 101 after a PT at each of the second nodes 102 and 103 in which the content is available elapses. A PT is a time used by a CS to process each request in an interest packet.

The local CS (h=0) may initiate identifying of content for a request 2 based on information on the available preceding content (for example, the content $C_1$). When the content for the request 2 is unavailable in the local CS (h=0), the first node 101 modifies the actual interest packet 301.

The local Cs (h=0) changes or modifies the actual interest packet 301, and transmits a changed or modified interest packet 301a to the adjacent second node 102. A hop count of the second node 102 is 1 (h=1).

The first node 101 changes a number of requests included in the interest packet 301, and provides a request start segment number to the changed interest packet 301a. The changed or modified interest packet 301a includes a current window size $W_c$ of 8, that is a number of requests in the interest packet 301a, and a request start segment number of 2.

When the second node 102, for example, a node adjacent to the first node 101, receives the changed or modified interest packet 301a, the second node 102 processes the modified interest packet 301a to identify pieces of content associated with requests 2 through 9 in the modified interest packet 301a.

Since the request start segment number in the modified interest packet 301a is 2, the second node 102 determines an availability of content for a third request, for example, the request 2. When the second node 102 determines the availability of the content for the request 2, the second node 102 transmits the content for the request 2 to a CCN engine belonging to the local CS (h=0) of the first node 101. The local CS (h=0) stores the content (content $C_2$) for the request 2, and transmits the content for the request 2 to the first node 101.

The second node 102 identifies content, for example, content $C_3$, for a request 3 based on information of the identified immediately preceding content, in this example the content $C_2$.

The second node 102 may identify the content (the content $C_3$) using a subsequent pointer or a subsequent index of the identified immediately preceding content (the content $C_2$. The content (the content $C_3$) may be encoded and stored in a CS (belonging to the second node 102), and thus the second node 102 may parse the content (the content $C_3$). The second node 102 may match the content (the content $C_3$) to a prefix of the preceding content (for example, the content $C_2$). When a prefix of the content $C_3$ is matched to the prefix of the content $C_2$, a determination may be performed to verify whether the content $C_3$ is content subsequent to the content $C_2$.

When the prefix of the content $C_3$ is not matched to the prefix of the content $C_2$, the interest packet 301a is changed or modified, and transmitted to an adjacent node, for example, the second node 103.

The determination may be performed by matching a segment number of the content $C_3$ to the segment number of the content $C_2$.

To determine whether the content $C_3$ is content subsequent to the content $C_2$, it is determined whether a difference between the segment number of the content $C_3$ and the segment number of the content $C_2$ is 1.

When the determination is true, for example, when the content $C_3$ indicates content subsequent to the content $C_2$, verification is performed by matching the content (the content $C_3$) to remaining interest fields. When the content $C_3$ is matched to the remaining interest fields, the content $C_3$ is transmitted from the CS (belonging to the second node 102).

When the determination is false, for example, when the content $C_3$ does not indicate content subsequent to the content $C_2$, the interest packet 301a is changed or modified, and transmitted to the adjacent node, for example, the second node 103.

The second node 102 transmits content associated with each request to the CCN engine 200 (belonging to the local CS (h=0)) of the first node 101 after a PT elapses. When the content for each request is received from the second node 102, the local CS (h=0) stores the received content for each request. The CCN engine 200 (belonging to the local CS (h=0)) of the first node 101 transmits the received content to the first node 101.

In the example in FIG. 5, the second node 102 identifies pieces of content for requests 2 through 5, and transmits the pieces of content to the CCN engine 200 (belonging to the local CS (h=0)) of the first node 101. The CCN engine 200 (belonging to the local CS (h=0)) of the first node 101 transmits each of the received pieces of content to the first node 101.

The changed interest packet 301a may be changed once again by the second node 102 before being delivered to the second node 103. In this example, a changed or modified interest packet 301b includes a current window size $W_c$ of 4 (a number of requests in the interest packet 301b), and a request start segment number of 6.

The second node 103 receives the modified interest packet 301b, and determines the number of requests in the modified interest packet 301b. The second node 103 processes the modified interest packet 301b to identify pieces of content associated with requests 6 through 9.

The second node 103 processes each request based on information of content identified for a preceding request, and transmits identified content to the second node 102 as described above. The second node 102 stores the received content, and delivers the received content to the CCN engine 200 (belonging to the local CS (h=0)) of the first node 101.

The CCN engine 200 (belonging to the CS (h=0)) of the first node 101 stores the received content in the CS of the CCN engine 200, and transmits the content to the first node 101.

In addition, the local CS (h=0) may receive another interest packet 302 differing from the interest packet 301 from the first node 101. By iteratively performing the process described above, content corresponding to the interest packet 302 may be transmitted to the first node 101.

The technical descriptions provided with reference to FIGS. 1 through 4B are also applicable to FIG. 5, and thus will be omitted for conciseness.

Figure 6:
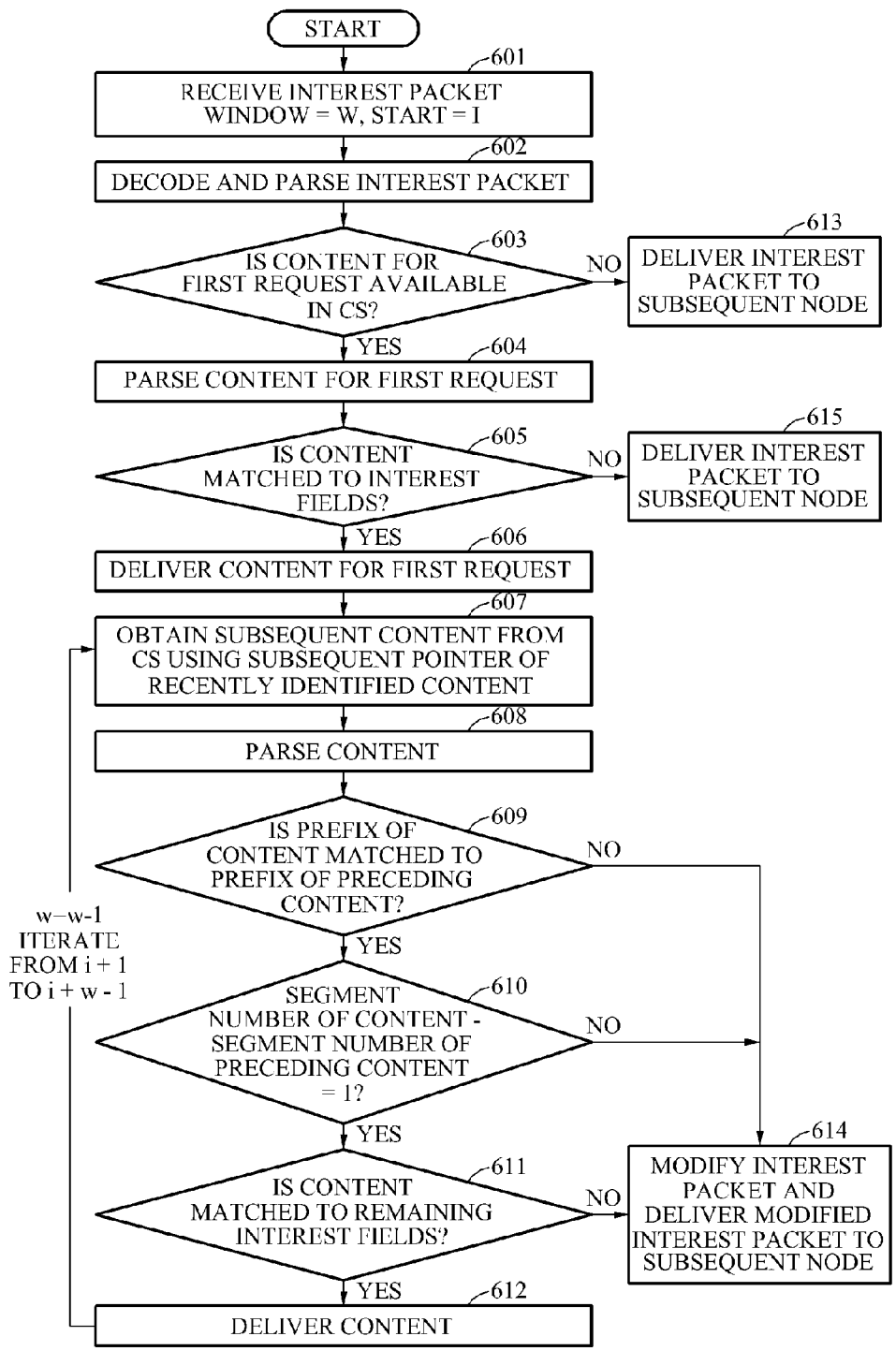
FIG. 6 illustrates an example of a method of delivering pieces of content from a CS when an interest packet includes a plurality of requests.

FIG. 6 illustrates an example of a method of delivering pieces of content from a CS when an interest packet includes a plurality of requests.

Referring to FIG. 6, the method of delivering pieces of content from the CS will be described. In operation 601, a node in a CCN receives an interest packet including a plurality of requests.

The interest packet includes a request start segment number and a window size indicating a number of the requests in the interest packet.

When the node receives the interest packet, the node decodes and parses the interest packet in operation 602. The node may perform a duplication and a validity check to determine whether the received interest packet is correct. The node may add the received interest packet to a forwarding table.

In operation 603, the node determines an availability of content for a first request among the plurality of requests in the interest packet in a CS (belonging to the node). When it is determined in operation 603 that the content for the first request is available, the node parses the content for the first request in operation 604. When it is determined in operation 603 that the content for the first request is unavailable, the node delivers the interest packet to a subsequent node such as an adjacent node in operation 613. When the content is parsed in operation 604, the node may verify the content for the first request by matching the content to interest fields and exclude filters in operation 605. The interest fields may include, for example, a prefix of the interest packet, and a segment number of the content (received along with the interest packet). The exclude filters may be used to match interests to exclude content including components matching filters 1 level below prefix lengths of the interests. These filters may include at least one element. Further, the element may include a component name, a Bloom filter, or any other element.

When the verification in operation 605 is true, for example, when the content is matched to the interest fields, the content for the first request is delivered in operation 606.

When the verification in operation 605 is false, for example, when the content is not matched to the interest fields, the node delivers the interest packet to a subsequent node (an adjacent node) in operation 615.

When the content for the first request is transmitted, the node obtains content for a subsequent request, for example, a second request, using a subsequent pointer of the recently identified content in operation 607.

Content for a subsequent request may be obtained by the node based on information on content identified for an immediately preceding request.

When the subsequent content for the subsequent request is obtained using a subsequent index or a subsequent pointer of the identified content, the subsequent content is parsed to decode content for a subsequent request in the interest packet in operation 608.

In operation 609, the content for the subsequent request is verified by matching a prefix of the content to a prefix of the identified preceding content. When the verification in operation 609 is false, for example, when the prefixes are not matched, the node modifies the interest packet and delivers the modified interest packet to an adjacent node in operation 614.

When the verification in operation 609 is true, for example, when the prefixes are matched, the node determines whether the content for the subsequent request is content subsequent to the identified immediately preceding content. In operation 610, the node matches a segment number of the obtained subsequent content to a segment number of the identified immediately preceding content.

When the matching in operation 610 is true, for example, when a difference between the segment numbers is 1, the node matches the obtained subsequent content for the subsequent request to remaining interest fields, for example, exclude filters, in operation 611. The exclude filters may be used to match interests to exclude content including components matching filters 1 level below prefix lengths of the interests. These filters may include at least one element. Further, the element may include a component name, a Bloom filter, or any other element.

When the matching in operation 610 is false, for example, when the subsequent content is not matched to the interest fields, the node modifies the interest packet and delivers the modified interest packet to a subsequent node, for example, an adjacent node.

When the matching in operation 611 is true, for example, when the subsequent content is matched to the interest fields, the obtained subsequent content is delivered in operation 612. When the matching in operation 611 is false, for example, when the subsequent content is not matched to the interest fields, the node modifies the interest packet and delivers the modified interest packet to a subsequent node, for example, an adjacent node, in operation 614.

Operations of FIG. 6 may be performed in the illustrated order, in a different order, or simultaneously. In addition, in some examples, some of the operations of FIG. 6 may be omitted.

The technical descriptions provided with reference to FIGS. 1 through 5 are also applicable to FIG. 6, and thus will be omitted for conciseness.

Figure 7A:
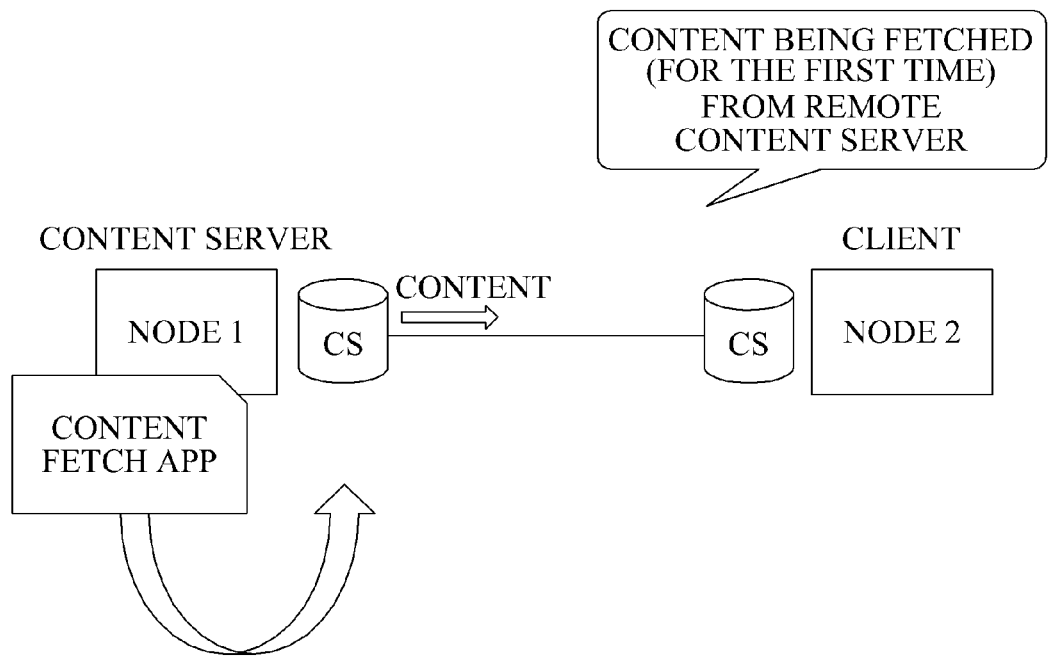
FIGS. 7A and 7B illustrate an example of implementation setups to show a performance gain when a method of delivering content from a CS is used.
Figure 7B:
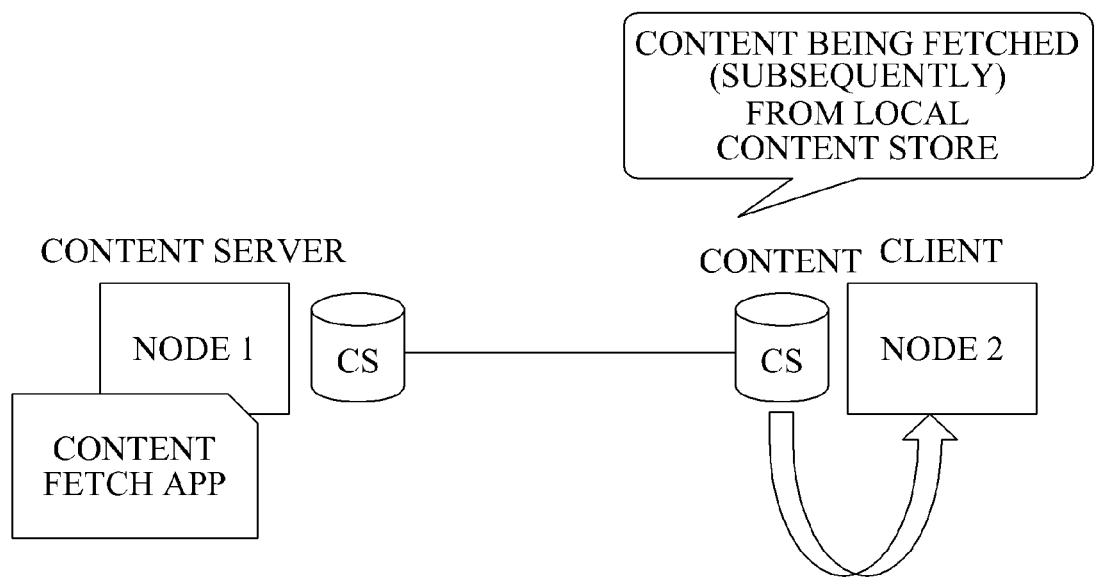

FIGS. 7A and 7B illustrate an example of implementation setups to show a performance gain when a method of delivering content from a CS is used.

In Scenario 1 of FIG. 7A, all pieces of content are received from a CCN content server, for example, a node 1. When the content is received from the CCN content server, the content is stored in both a CS of a node 2 and a CS of the CCN content server. In Scenario 2 of FIG. 7B, a subsequent request for content may be performed from a local CS. A provided setup may be selected based on an absence of networking overhead when the content is received from the local CS. Accordingly, a throughput gain may be achieved only from a decrease in processing overhead, and thus a platform for a fair comparison between a general method and the method disclosed herein may be provided.

Figure 8A:
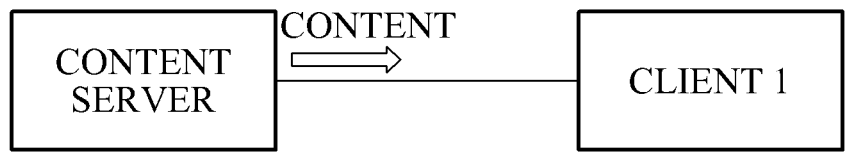
FIGS. 8A and 8B illustrate another example of implementation setups to show a performance gain when a method of delivering content from a CS is used.
Figure 8B:
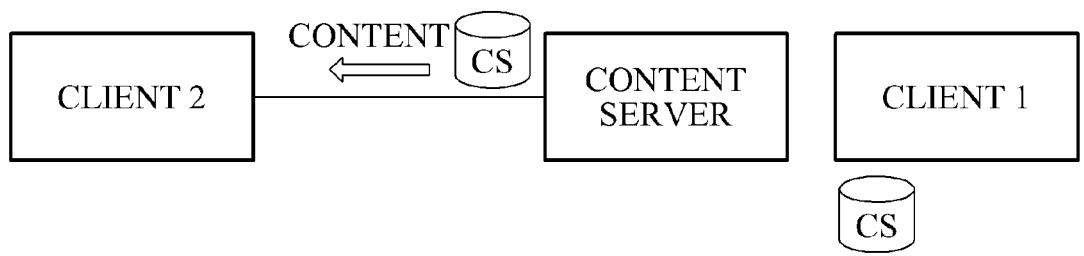

FIGS. 8A and 8B illustrate another example of implementation setups to show a performance gain when a method of delivering content from a CS is used.

In the scenarios illustrated in FIGS. 8A and 8B, a networking delay may be considered and performances may be compared. In Scenario 1 of FIG. 8A, a CCN client node 1 requests content from a CCN content server. Content may be unavailable in a local CS of the CCN content server at first. Thus, the content may be received by the CCN client node 1 from the CCN content server. In Scenario 3 of FIG. 8B, a CCN client node 2 requests identical content from a CCN content server. Since all pieces of the content are stored in a CS of the CCN content server, the CCN client node 2 receives the content from the CS of the CCN content server.

FIG. 9 illustrates an example of results of comparing times used to deliver content from a CS for the scenarios of FIGS. 7A and 7B.

A 104-megabyte (MB) file is requested from the CCN content server. When the content is received from the CCN content server, as indicated in a first row in a table of FIG. 9, Scenario 1, throughputs of the general method and the method disclosed herein are almost identical. When the content is received from the CS of the CCN client node 2 as in Scenario 2, a throughput gain of the method disclosed herein with respect to the general method may be observed.

FIG. 10 illustrates an example of results of comparing times used to deliver content from a CS for the scenarios of FIGS. 8A and 8B. A table of FIG. 10 exhibits values associated with performance gains of the method disclosed herein and the general method. In Scenario 3, a gain of the method disclosed herein with respect to the general method is estimated at 7.8%.

Figure 11:
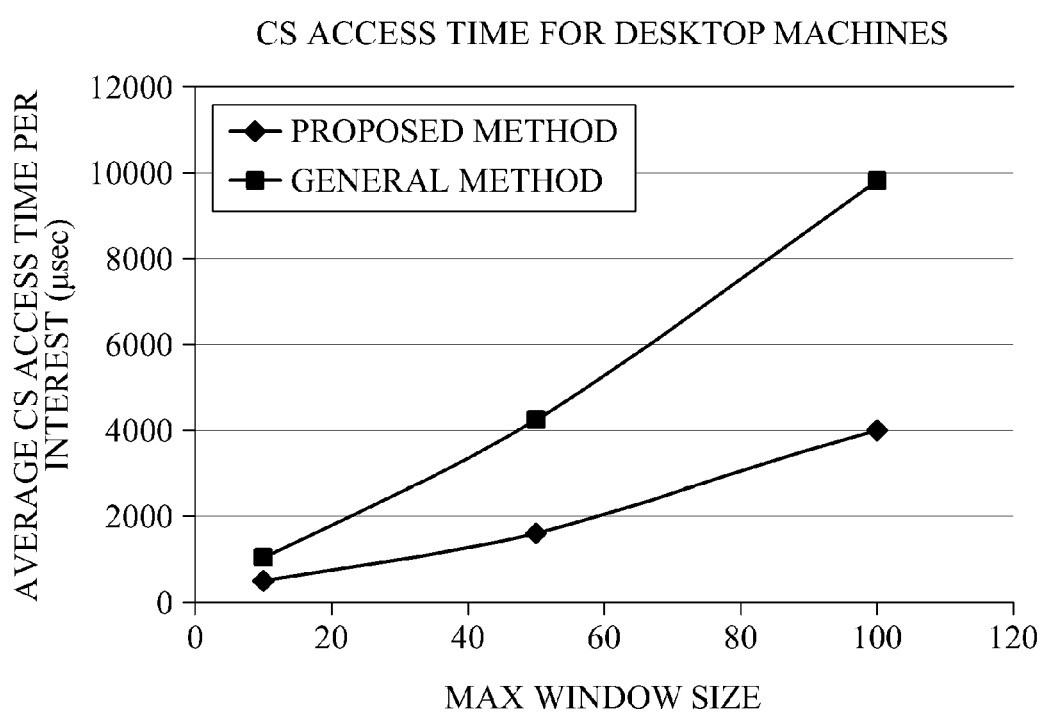
FIG. 11 illustrates an example of an average CS access time per interest for desktop machines.

FIG. 11 illustrates an example of an average CS access time per interest for desktop machines. A graph of FIG. 11 illustrates a complete CS access time on a CCN server when a CCN client receives all pieces of content from a CS of the CCN server. After obtaining a total access time, values may be normalized and plotted as shown in FIG. 11 by evaluating an average access time per interest. As a window size increases, a difference in CS access times between the method disclosed herein and the general method increases.

Figure 12:
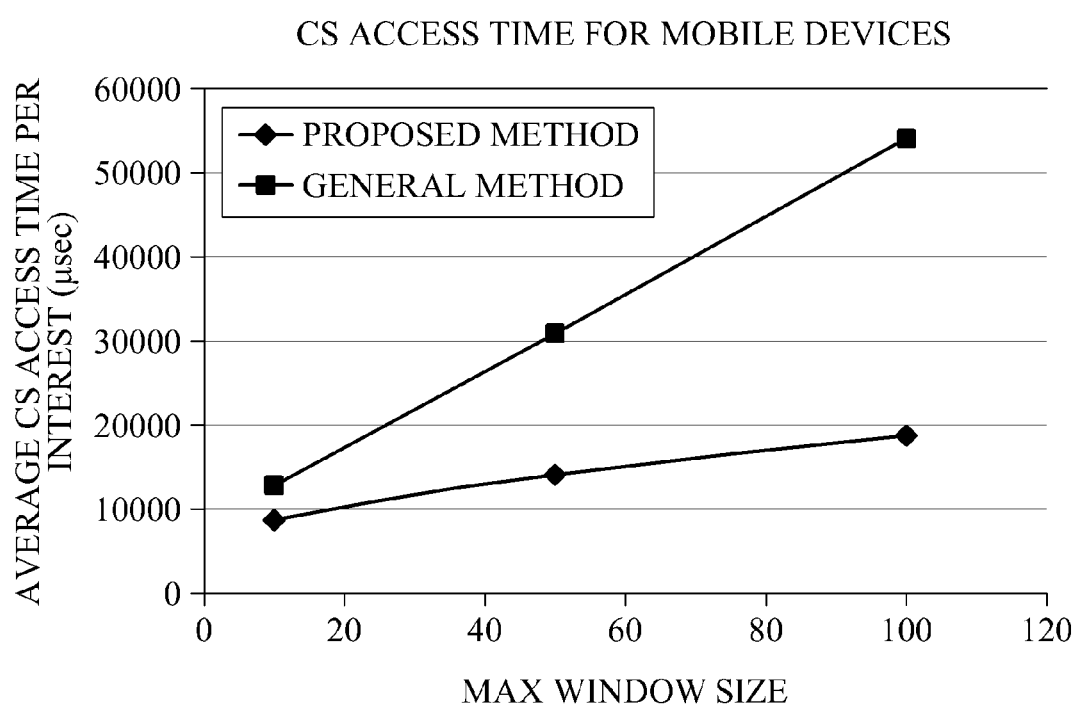
FIG. 12 illustrates an example of an average CS access time per interest for mobile devices.

FIG. 12 illustrates an example of an average CS access time per interest for mobile devices. As shown in FIG. 12, as throughputs of the mobile devices decrease, an access time difference increases. In FIG. 12, two Android-based mobile devices are used. Similar to a case in which two personal computers (PCs) are used as described with reference to FIG. 11, a decrease in a content access time is observed in the method disclosed herein. However, a time difference between the method disclosed herein and the general method may further increase in the scenario of the mobile devices being used, when compared to the scenario of the PCs being used.

Figure 13:
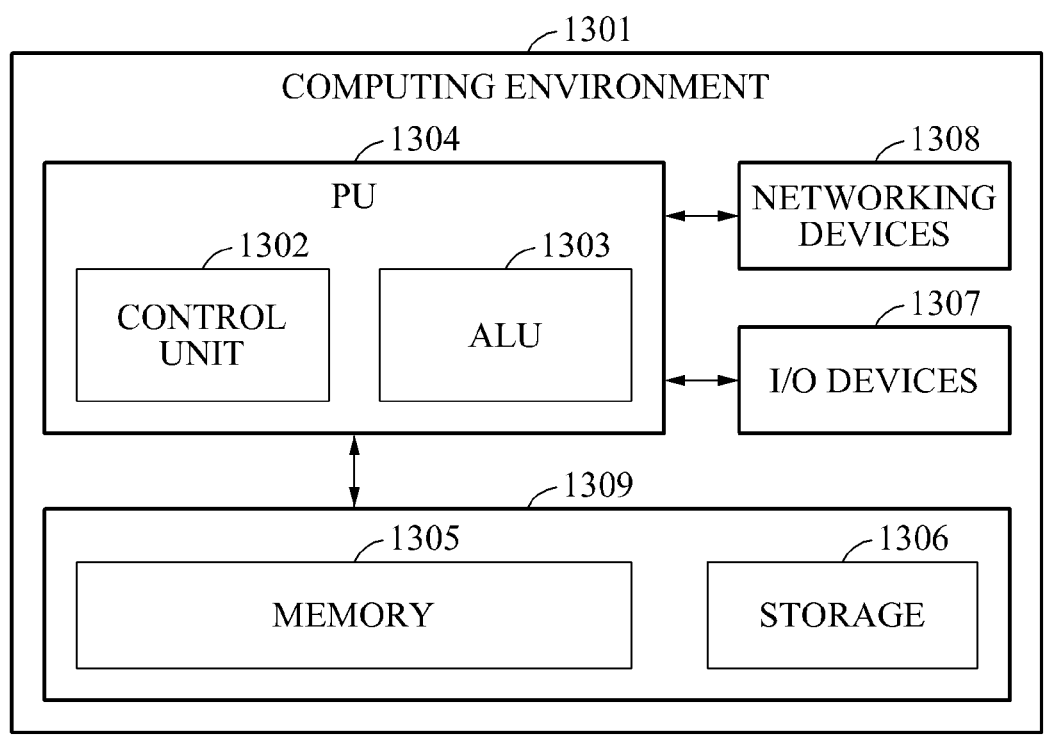
FIG. 13 illustrates an example of a computing environment to implement a method of delivering content from a CS in a CCN.

FIG. 13 illustrates an example of a computing environment 1301 to implement a method of delivering content from a CS in a CCN.

Referring to FIG. 13, the computing environment 1301 includes a processing unit (PU) 1304, a storage unit 1309, a plurality of networking devices 1308, and a plurality of input/output (I/O) devices 1307. The processing unit 1304 includes at least one control unit 1302, and an arithmetic logic unit (ALU) 1303. The storage unit 1309 includes a memory 1305, and a storage 1306. For example, the computing environment 1301 may be a computer system. The processing unit 1304 may process instructions of an algorithm. The processing unit 1304 may receive commands from the control unit 1302 to perform a processing task. Logical and arithmetic operations associated with execution of the instructions may be performed by means of the ALU 1303.

The computing environment 1301 may include multiple homogeneous and/or heterogeneous cores, different types of multiple central processing units (CPUs), special media, and other accelerators. The processing unit 1304 may process the instructions of the algorithm. Further, a plurality of processing units 1304 may be disposed on a single chip or a plurality of chips.

The algorithm including instructions and codes required for the implementation may be stored in either one or both of the memory 1305 and the storage 1306. During execution of the instructions, the instructions may be fetched from the corresponding memory 1305 and/or the corresponding storage 1306, and executed by the processing unit 1304.

By executing the instructions, the method of delivering content from a CS described with reference to FIGS. 1 through 6 may be performed.

In a hardware implementation, various networking devices 1308 or external I/O devices 1307 may be connected to the computing environment 1301 to support the implementation through a networking unit and an I/O device unit.

The technical descriptions provided with reference to FIGS. 1 through 6 are also applicable to FIG. 13, and thus will be omitted for conciseness.

The various devices shown in FIGS. 1-3 and 13 that perform the various operations described with respect to FIGS. 1-6 may be implemented using one or more hardware components, one or more software components, or a combination of one or more hardware components and one or more software components.

A hardware component may be, for example, a physical device that physically performs one or more operations, but is not limited thereto. Examples of hardware components include resistors, capacitors, inductors, power supplies, frequency generators, operational amplifiers, power amplifiers, low-pass filters, high-pass filters, band-pass filters, analog-to-digital converters, digital-to-analog converters, and processing devices.

A software component may be implemented, for example, by a processing device controlled by software or instructions to perform one or more operations, but is not limited thereto. A computer, controller, or other control device may cause the processing device to run the software or execute the instructions. One software component may be implemented by one processing device, or two or more software components may be implemented by one processing device, or one software component may be implemented by two or more processing devices, or two or more software components may be implemented by two or more processing devices.

A processing device may be implemented using one or more general-purpose or special-purpose computers, such as, for example, a processor, a controller and an arithmetic logic unit, a digital signal processor, a microcomputer, a field-programmable array, a programmable logic unit, a microprocessor, or any other device capable of running software or executing instructions. The processing device may run an operating system (OS), and may run one or more software applications that operate under the OS. The processing device may access, store, manipulate, process, and create data when running the software or executing the instructions. For simplicity, the singular term "processing device" may be used in the description, but one of ordinary skill in the art will appreciate that a processing device may include multiple processing elements and multiple types of processing elements. For example, a processing device may include one or more processors, or one or more processors and one or more controllers. In addition, different processing configurations are possible, such as parallel processors or multi-core processors.

A processing device configured to implement a software component to perform an operation A may include a processor programmed to run software or execute instructions to control the processor to perform operation A. In addition, a processing device configured to implement a software component to perform an operation A, an operation B, and an operation C may have various configurations, such as, for example, a processor configured to implement a software component to perform operations A, B, and C; a first processor configured to implement a software component to perform operation A, and a second processor configured to implement a software component to perform operations B and C; a first processor configured to implement a software component to perform operations A and B, and a second processor configured to implement a software component to perform operation C; a first processor configured to implement a software component to perform operation A, a second processor configured to implement a software component to perform operation B, and a third processor configured to implement a software component to perform operation C; a first processor configured to implement a software component to perform operations A, B, and C, and a second processor configured to implement a software component to perform operations A, B, and C, or any other configuration of one or more processors each implementing one or more of operations A, B, and C. Although these examples refer to three operations A, B, C, the number of operations that may implemented is not limited to three, but may be any number of operations required to achieve a desired result or perform a desired task.

Software or instructions for controlling a processing device to implement a software component may include a computer program, a piece of code, an instruction, or some combination thereof, for independently or collectively instructing or configuring the processing device to perform one or more desired operations. The software or instructions may include machine code that may be directly executed by the processing device, such as machine code produced by a compiler, and/or higher-level code that may be executed by the processing device using an interpreter. The software or instructions and any associated data, data files, and data structures may be embodied permanently or temporarily in any type of machine, component, physical or virtual equipment, computer storage medium or device, or a propagated signal wave capable of providing instructions or data to or being interpreted by the processing device. The software or instructions and any associated data, data files, and data structures also may be distributed over network-coupled computer systems so that the software or instructions and any associated data, data files, and data structures are stored and executed in a distributed fashion.

For example, the software or instructions and any associated data, data files, and data structures may be recorded, stored, or fixed in one or more non-transitory computer-readable storage media. A non-transitory computer-readable storage medium may be any data storage device that is capable of storing the software or instructions and any associated data, data files, and data structures so that they can be read by a computer system or processing device. Examples of a non-transitory computer-readable storage medium include read-only memory (ROM), random-access memory (RAM), flash memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, magnetic tapes, floppy disks, magneto-optical data storage devices, optical data storage devices, hard disks, solid-state disks, or any other non-transitory computer-readable storage medium known to one of ordinary skill in the art.

Functional programs, codes, and code segments for implementing the examples disclosed herein can be easily constructed by a programmer skilled in the art to which the examples pertain based on the drawings and their corresponding descriptions as provided herein.

While this disclosure includes specific examples, it will be apparent to one of ordinary skill in the art that various changes in form and details may be made in these examples without departing from the spirit and scope of the claims and their equivalents. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A method of delivering content, the method comprising:
   receiving an interest packet in a content-centric networking (CCN), the interest packet comprising a plurality of requests each corresponding to a content object;
   determining an availability of content for a first request among the plurality of requests in a content store (CS);
   fetching available pieces of content from the CS for a set of sequential requests starting from the first request among the plurality of requests in response to the content for the first request being available in the CS, the fetching comprising fetching available pieces of content for each remaining request subsequent to the first request among the sequential requests based on information from content identified for a request immediately preceding the each remaining request, the available pieces of content in the CS is a piece of candidate content;
   delivering the fetched available pieces of content, and
   changing the interest packet based on an availability of the content in the CS for the set of sequential requests before transmitting the changed interest packet to an adjacent node.

2. The method of claim 1, further comprising transmitting the interest packet to the adjacent node in the CCN to fetch available pieces of content from the adjacent node in response to the content for the first request being unavailable in the CS.

3. The method of claim 1, wherein the changing comprises changing a parameter of the interest packet by changing either one or both of a request start segment number and a number of the requests included in the interest packet.

4. The method of claim 1, wherein the fetching comprises matching the content for the first request to interest fields in the interest packet in response to the content for the first request being available in the CS;
the interest fields comprise either one or both of a prefix of the interest packet and a segment number of content; and
the delivering comprises transmitting the content for the first request to a node requesting the content for the first request in the CCN in response to the content for the first request being matched to the interest fields.

5. The method of claim 1, wherein the information represents an index or a pointer of the content identified for the request immediately preceding the each remaining request.

6. The method of claim 1, wherein each piece of content in the CS is a piece of candidate content; and
the fetching of the available pieces of content for each remaining request comprises matching a prefix of each piece of candidate content to a prefix of the content identified for the request immediately preceding the each remaining request to identify content subsequent to the content identified for the request immediately preceding the each remaining request.

7. The method of claim 1, wherein each piece of content in the CS is a piece of candidate content; and
the fetching of the available pieces of content for each remaining request comprises matching a segment number of each piece of candidate content to a segment number of the content identified for the request immediately preceding the each remaining request to identify content subsequent to the content identified for the request immediately preceding the each remaining request.

8. The method of claim 7, wherein the fetching of the available pieces of content for each remaining request further comprises matching a prefix of each piece of candidate content to a prefix of the content identified for the request immediately preceding each remaining request to identify the content subsequent to the content identified for the request immediately preceding the each remaining request; and
the matching of the segment number of the each piece of candidate content to the segment number of the content identified for the request immediately preceding the each remaining request comprises identifying a piece of candidate content having a prefix that matches the prefix of the content identified for the request immediately preceding the each remaining request and having a segment number that differs by 1 from the segment number of the content identified for the request immediately preceding the each remaining request as content immediately subsequent to the content identified for the request immediately preceding the each remaining request.

9. A non-transitory computer-readable storage medium storing instructions to cause a computer to perform the method of claim 1.

10. A node configured to deliver content in a content-centric networking (CCN), the node comprising:
   an integrated circuit comprising a processor; and
   a memory storing computer program code to be executed by the processor;
   wherein the processor is configured to cause the node to perform a method in response to the computer program code being executed, the method comprising:
   receiving an interest packet comprising a plurality of requests each corresponding to a content object;
   determining an availability of content for a first request among the plurality of requests in a content store (CS);

fetching available pieces of content from the CS for a set of sequential requests starting from the first request among the plurality of requests in response to the content for the first request being available in the CS, the fetching comprising fetching available pieces of content for each remaining request subsequent to the first request among the sequential requests based on information from content identified for a request immediately preceding the each remaining request, the available pieces of content in the CS is a piece of candidate content;

delivering the fetched available pieces of content; and changing the interest packet based on an availability of the content in the CS for the set of sequential requests before transmitting the changed interest packet to an adjacent node.

11. The node of claim 10, wherein the method further comprises transmitting the interest packet to the adjacent node in the CCN to fetch available pieces of content from the adjacent node in response to the content for the first request being unavailable in the CS.

12. The node of claim 10, wherein the method further comprises changing a parameter of the interest packet by changing either one or both of a request start segment number and a number of the requests included in the interest packet.

13. The node of claim 10, wherein the method further comprises matching the content for the first request to interest fields in the interest packet in response to the content for the first request being available in the CS;

the interest fields comprise either one or both of a prefix of the interest packet and a segment number of content; and the delivering comprises transmitting the content for the first request to a node requesting the content for the first request in the CCN in response to the content for the first request being matched to the interest fields.

14. The node of claim 10, wherein the information represents an index or a pointer of the content identified for the request immediately preceding the each remaining request.

15. The node of claim 10, wherein each piece of content in the CS is a piece of candidate content; and the matching of the available pieces of content for the each remaining request comprises matching a prefix of each piece of candidate content to a prefix of the content identified for the request immediately preceding the each remaining request to identify content subsequent to the content identified for the request immediately preceding the each remaining request.

16. The node of claim 10, wherein each piece of content in the CS is a piece of candidate content; and the fetching of the available pieces of content for the each remaining request comprises matching a segment number of each piece of candidate content to a segment number of the content identified for the request immediately preceding the each remaining request to identify content subsequent to the content identified for the request immediately preceding the each remaining request.

17. The node of claim 16, wherein the fetching of the available pieces of content for the each remaining request further comprises matching a prefix of the each piece of candidate content to a prefix of the content identified for the request immediately preceding the each remaining request to identify the content subsequent to the content identified for the request immediately preceding the each remaining request; and the matching of the segment number of the each piece of candidate content to the segment number of the content identified for the request immediately preceding the each remaining request comprises identifying a piece of candidate content having a prefix that matches the prefix of the content identified for the request immediately preceding the each remaining request and having a segment number that differs by 1 from the segment number of the content identified for the request immediately preceding the each remaining request as content immediately subsequent to the content identified for the request immediately preceding the each remaining request.

18. A method of delivering content comprising:

receiving an interest packet comprising a plurality of requests for sequential pieces of content at a node of a content-centric network (CCN);

fetching available sequential pieces of content from a content store of the node for sequential requests of the plurality of requests based on a first piece of content of the fetched sequential pieces of content;

delivering the fetched sequential pieces of content, the available sequential pieces of content in the CS is a piece of candidate content, changing the interest packet to request remaining pieces of content that are not available in the content store of the node; and transmitting the changed interest packet to another node in the CCN.

19. The method of claim 18, wherein the fetching comprises:

fetching a piece of content in the content store having a prefix and a segment number that match a prefix and a segment number of a first request of the sequential requests; and for the each remaining request of the sequential requests, fetching a piece of content in the content store having a prefix that matches a prefix of a fetched piece of content fetched in response to an immediately preceding one of the sequential requests and a segment number that differs by 1 from a segment number of the fetched piece of content fetched in response to the immediately preceding one of the sequential requests.

* * * * *